United States Patent
Lin et al.

(10) Patent No.: US 7,236,529 B2
(45) Date of Patent: Jun. 26, 2007

(54) METHODS AND SYSTEMS FOR VIDEO TRANSCODING IN DCT DOMAIN WITH LOW COMPLEXITY

(75) Inventors: Chia-Wen Lin, Chiayi (TW); Hsu-Kai Tsai, Taipei (TW); Jia-Jyh Luo, Hsin-Dian (TW)

(73) Assignee: Industrial Technology Research Institute, Hsinchu (TW)

( * ) Notice: Subject to any disclaimer, the term of this patent is extended or adjusted under 35 U.S.C. 154(b) by 483 days.

(21) Appl. No.: 10/138,649

(22) Filed: May 6, 2002

(65) Prior Publication Data

US 2003/0081676 A1 May 1, 2003

Related U.S. Application Data

(60) Provisional application No. 60/330,769, filed on Oct. 30, 2001.

(51) Int. Cl.
    *H04N 7/12* (2006.01)
(52) U.S. Cl. .................................... 375/240.2
(58) Field of Classification Search .......... 375/240.01, 375/240.12, 240.13, 240.18, 240.2, 240.21, 375/240.24, 240.26; H04N 7/12
    See application file for complete search history.

(56) References Cited

U.S. PATENT DOCUMENTS

| | | | |
|---|---|---|---|
| 5,537,440 A | 7/1996 | Eyuboglu et al. | |
| 5,544,266 A | 8/1996 | Koppelmans et al. | |
| 5,600,646 A | 2/1997 | Polomski | |
| 5,657,015 A | 8/1997 | Nakajima et al. | |
| 5,699,119 A * | 12/1997 | Chung et al. | 375/240.24 |
| 5,729,293 A | 3/1998 | Keesman | |
| 5,764,298 A | 6/1998 | Morrison | |
| 5,940,130 A | 8/1999 | Nilsson et al. | |
| 6,058,143 A | 5/2000 | Golin | |
| 6,081,295 A | 6/2000 | Adolph et al. | |
| 6,144,698 A | 11/2000 | Poon et al. | |

(Continued)

FOREIGN PATENT DOCUMENTS

WO     WO 99/29113     6/1999

OTHER PUBLICATIONS

"Transcoding of MPEG bistreams", G. Keesman et al., Signal Processing Im age Communication 8 (1996) 481-500, May 25, 1995.

(Continued)

*Primary Examiner*—Young Lee
(74) *Attorney, Agent, or Firm*—Finnegan, Henderson, Farabow, Garrett & Dunner, L.L.P.

(57) ABSTRACT

Methods and systems for transcoding a video sequence in a discrete cosine transform (DCT) domain, wherein a transcoder receives a video bit-stream including frames and each of the frames including blocks. The video bit-stream includes an intra-frame and an inter-frame that has been encoded by motion compensation based on the intra-frame or another inter-frame. A DCT-domain motion compensation module in the transcoder re-calculates first DCT coefficients for a target block in the inter-frame. For this re-calculation of the first DCT coefficients, the motion compensation module inputs second DCT coefficients of neighboring blocks in the inter-frame, and calculates partial DCT coefficients, using significant ones of the second DCT coefficients of the neighboring blocks.

20 Claims, 9 Drawing Sheets

U.S. PATENT DOCUMENTS 6,226,338 B1     5/2001    Earnest
6,466,623 B1    10/2002   Youn et al.

OTHER PUBLICATIONS

"A Frequency-Domain Video Transcoder for Dynamic Bit-Rate Reduction of MPEG-2 Bit Streams", P.A.A. Assuncao et al, IEEE Transaction on Circuits and Sy stems for Video Technology, vol. 8, No. 8, Dec. 1998, pp. 953-967.

"Video Transcoder Architectures for Bit Rate Scaling of H. 263 Bit Streams", J. Youn et al, Proc. IEEE Int. Symp. Circuits and Systems, Geneva, Switzerland, May 2000.

International Telecommunications Union, Draft ITU-T SG-15 Recommendation H.263, "*Video Coding for Low Bitrate Communication*," May 1996.

International Telecommunications Union, ITU Telecommunications Standardization Sector LBC-95, ITU-T SG-15, "*Video Codec Test Model, TMN5*," Jan. 1995.

N. Bjork and C. Christopoulos, "Transcoder Architectures For Video Coding," IEEE Trans. on Consumer Electronics, vol. 44, No. 1, pp. 2813-2816, Feb. 1998.

ISO/IEC Standard Specification 13818-2, "Information Technology-Generic Coding of Moving Pictures and Associated Audio Information-Part 2: Video," 1996.

ITU-T Rec. H. 263, "Video Coding for Low Bit Rate Communication," Feb. 1998.

J. Youn, M.-T. Sun, "Motion Estimation for High Performance Transcoding," IEEE Conference on Consumer Electronics, pp. 136-137, Jun. 2-4, 1998.

N. Chaddha, "A Software Only Scalable Video Delivery System for Multimedia Applications Over Heterogeneous Networks," IEEE Int. Conf. on Image Processing, Washington, D.C., Oct. 1995.

R. Mokry and D. Anastassiou, "Minimal Error Drift in Frequency Scalability for Motion-Compensated DCT Coding," IEEE Transactions on Circuits and Systems for Video Technology, vol. 4, No. 4, pp. 392-406, and 447-449, Aug. 1994.

IEEE Standards, "Standard Specifications for the Implemenation of 8×8 Inverse Discrete Cosine Transform," IEEE, pp. 7-13.

S.-F. Chang and D.G. Messerschmitt, "Manipulation and Compositing of MC-DCT Compressed Video," IEEE Journal on Selected Areas in Communications, pp. 1-11, Jan. 1995.

Chia-Wen Lin and Yuh-Reuy Lee, "Fast Algorithms for DCT-Domain Video Transcoding," IEEE International Conference on Image Processing, pp. 421-424, Oct. 7, 2001, Thessaloniki, Greece.

M. Ghanbari, "Two-Layer Coding of Video Signals for VBR Networks," IEEE Journal on Selected Areas in Communications, vol. 7, pp. 771-781, Jun. 1989.

J. Youn, M.T. Sun, and J. Xin, "Video Transcoder Architectures for Bit Rate Scaling of H. 263 Bit Streams," C. Multimedia Conf. 1999, Orlando, Nov. 1999.

J. Youn, J. Xin, and M.T. Sun, "Fast Video Transcoder Architectures for Networked Multimedia Applications," IEEE Int. Symp. on Circuits and Systems, Geneva, Switzerland, May 2000.

J. Song and B.-L. Yeo, "A Fast Algorithm for DCT-Domain Inverse Motion Compensation Based on Shared Information in a Macroblock," IEEE on Trans. Circuits and Syst. for Video Technol., vol. 10, No. 5, pp. 767-775, Aug. 2000.

J. Moura, R. Jasinschi, H. Shiojiri-H. and J-C. Lin, "Scalable Video Coding Over Heterogeneous Networks," SPIE—The International Society for Optical Engineering, vol. 2602, pp. 294-306, 1996.

D.G. Morrison, M.E. Nilsson, and M. Ghanbari, "Reduction of the Bit-Rate of Compressed Video While in its Coded Form," Sixth Int. Workshop Packet Video, Portland, OR, Sep. 1994.

G. Keesman et al., "*Transcoding of MPEG Bitstreams*," Signal Processing Image Comm. vol. 8, pp. 481-500, 1996.

A. Eleftheriadis and D. Anastassiou, "*Constrained And General Dynamic Rate Shaping Of Compressed Digital Video*," ICIP '95, pp. 396-399, 1995.

H. Sun, W. Kwok, and J.W. Zdepski, "*Architectures for MPEG Compressed Bitstream Scaling*," IEEE Trans. on Circuits and Systems for Video Technology, vol. 6, No. 2, pp. 191-199, Apr. 1996.

P.N. Tudor and O.H. Werner, "*Real-Time Transcoding of MPEG-2 Video Bit Streams*," International Broadcasting Convention, Conference Publication No. 447, pp. 296-301, Sep. 12-16, 1997.

P. Assuncao and M. Ghanbari, "*Post-processing of MPEG2 Coded Video For Transmission At Lower Bit Rates*," ICASSP '96, vol. 4, pp. 1998-2001, May 1996.

P. Assuncao and M. Ghanbari, "*Optimal Transcoding of Compressed Video*," ICIP '97, pp. 739-742, 1997.

P. Assuncao et al., "*A Frequency-Domain Video Transcoder for Dynamic Bit-Rate Reduction of MPEG-2 Bit Streams*," IEEE Transactions on Circuits and Systems for Video Technology, vol. 8, No. 8, pp. 953-967, 1998.

U.S. Appl. No. 09/276,826, filed Mar. 18, 2002, titled Method and Apparatus for Motion Estimation for High Performance Transcoding.

U.S. Appl. No. 09/796,600, filed Mar. 2, 2001, titled Transcoding Apparatus and Method.

\* cited by examiner

Foreman

| Measured Frame Rate | DDT | Fast DDT | |
|---|---|---|---|
| | 7.97 fps | 95% | 15.11 fps |
| | | 90% | 15.95 fps |
| | | 85% | 16.31 fps |

| | Y | $C_r$ | $C_b$ | | Y | $C_r$ | $C_b$ |
|---|---|---|---|---|---|---|---|
| PSNR (dB) | 30.36 | 38.78 | 38.10 | 95% | 30.02 | 37.59 | 36.34 |
| | | | | 90% | 29.83 | 37.59 | 36.21 |
| | | | | 85% | 29.75 | 37.58 | 36.22 |

Fig. 9A

Carphone

| Measured Frame Rate | DDT | Fast DDT | |
|---|---|---|---|
| | 10.50 fps | 95% | 16.82 fps |
| | | 90% | 17.93 fps |
| | | 85% | 18.47 fps |

| | Y | $C_r$ | $C_b$ | | Y | $C_r$ | $C_b$ |
|---|---|---|---|---|---|---|---|
| PSNR (dB) | 31.44 | 37.93 | 39.19 | 95% | 31.14 | 36.28 | 38.28 |
| | | | | 90% | 31.00 | 36.28 | 37.90 |
| | | | | 85% | 30.86 | 36.08 | 38.02 |

Fig. 9B

METHODS AND SYSTEMS FOR VIDEO TRANSCODING IN DCT DOMAIN WITH LOW COMPLEXITY

RELATED APPLICATION DATA

The present application is related to and claims the benefit of U.S. Provisional Application No. 60/330,769, filed on Oct. 30, 2001, entitled "Fast Algorithms for DCT-domain Video Transcoding," which is expressly incorporated in its entirety herein by reference.

BACKGROUND OF THE INVENTION

1. Field of the Invention

The present invention is generally related to digital video signal processing using video compression schemes such as MPEG (Moving Picture Experts Group) and H.26x (ITU-T Recommendation H.261 or H.263). The invention is more particularly related to methods and systems for video transcoding in a compressed domain, such as a discrete cosine transform (DCT) domain.

2. Background

Video transcoding is a process of converting a previously compressed video bit-stream into another compressed video bit-stream with a lower bit-rate, a different display format (e.g., downscaling), or a different coding method (e.g., conversion between H.26x and MPEG, conversion among MPEG-1, 2, and 4, or adding error resilience), etc. An application of the bit-rate adaptation (usually rate reduction) can provide fine and dynamic adjustments of the bit-rate of the video bit-stream according to actual network conditions, e.g., available bandwidth.

The bit-rate adaptation may be performed for video bridging over heterogeneous networks, for example, multi-point video conferencing, remote collaboration, remote surveillance, video on demand, video multicast over heterogeneous networks, and streaming video. The video transcoder placed at a boundary between the heterogeneous networks enables each receiver of the video bit-stream to decode video as received, without additional functional requirements in the decoder.

Figure 1:
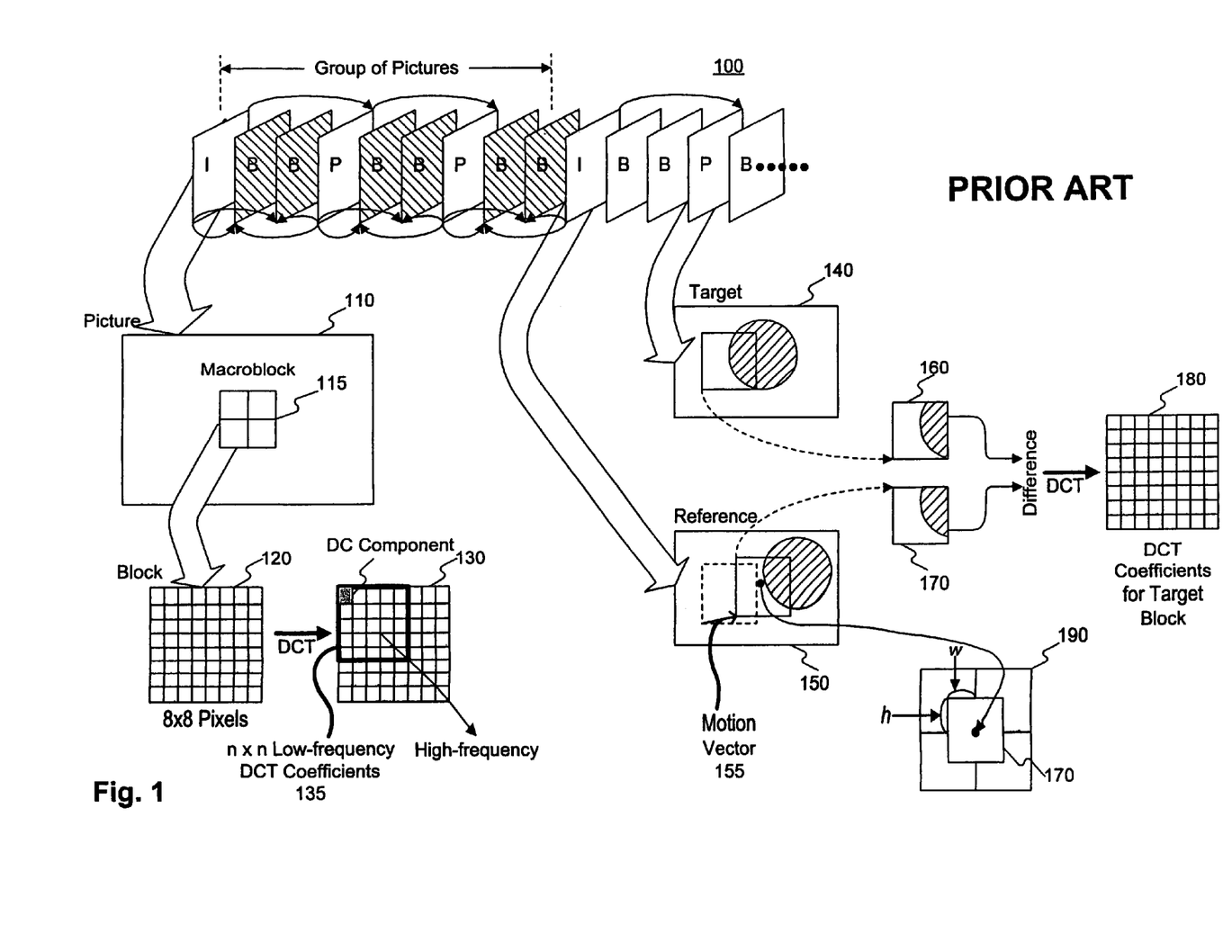
FIG. 1 illustrates a basic process of video coding.

FIG. 1 shows an exemplary process of video coding. Video compression is based on motion compensated predictive coding with an I-P or I-B-P frame structure. Here, I, P, and B frames represent intra, predictive, and interpolated frames, respectively. P and B frames are also called "inter-frames," whereas I frames are "intra-frames." An MPEG video sequence 100 has a group-of-picture (GOP) structure in which a P-frame coding is dependent on its precedent I/P-frame, and a B-frame coding is dependent on its preceding I/P-frame and succeeding I/P frame.

Each frame (picture) 110 is divided into blocks 120, each of which comprises 8×8 pixels. A 2×2 matrix of blocks is called a macroblock 115. For intra-frames, DCT converts each block 120 of pixels into a block of 8×8 DCT coefficients 130. The most upper-left coefficient is a DC component, i.e., a zero spatial frequency component. In the 8×8 block, as a distance from the most upper-left point becomes larger, the spatial frequency the coefficient represents becomes higher. Human eyes are more sensitive to lower-frequency coefficients, and thus n×n low-frequency DCT coefficients 135 may be sufficient for a required quality of decoded pictures.

For inter-frames, motion compensation is performed. A frame to code is called a "target" frame 140, and its preceding (and succeeding in the case of coding B-frames) I/P frame is called a "reference" frame 150. For each block 160 in target frame 140, reference frame 150 is searched to find a block 170 whose image best matches an image of block 160. A decoded image (not an original image) is used as the image of reference frame 150. A motion vector 155 represents an amount and direction of the movement of block 160 relative to block 170.

Then, a difference (prediction error) between the image of 8×8 pixel block 160 and the image of 8×8 pixel block 170 is calculated, and DCT converts the difference into DCT coefficients 180 for target block 160. Motion vectors 155 can be specified to a fraction of a pixel, i.e., half-pixels. The best-matching reference block 170 may not be aligned with the original blocks of reference frame 150, and may intersect with two or four neighboring blocks 190 of the original blocks. The location of block 170 within neighboring blocks 190 is represented by a height (h) and a width (w). An overlapping area of block 170 with the upper-right block of neighboring blocks 190 is h×w. An overlapping area of block 170 with the lower-right block of neighboring blocks 190 is (8−h)×w. An overlapping area of block 170 with the upper-left block of neighboring blocks 190 is h×(8−w). An overlapping area of block 170 with the lower-left block of neighboring blocks 190 is (8−h)×(8−w).

Figure 2:
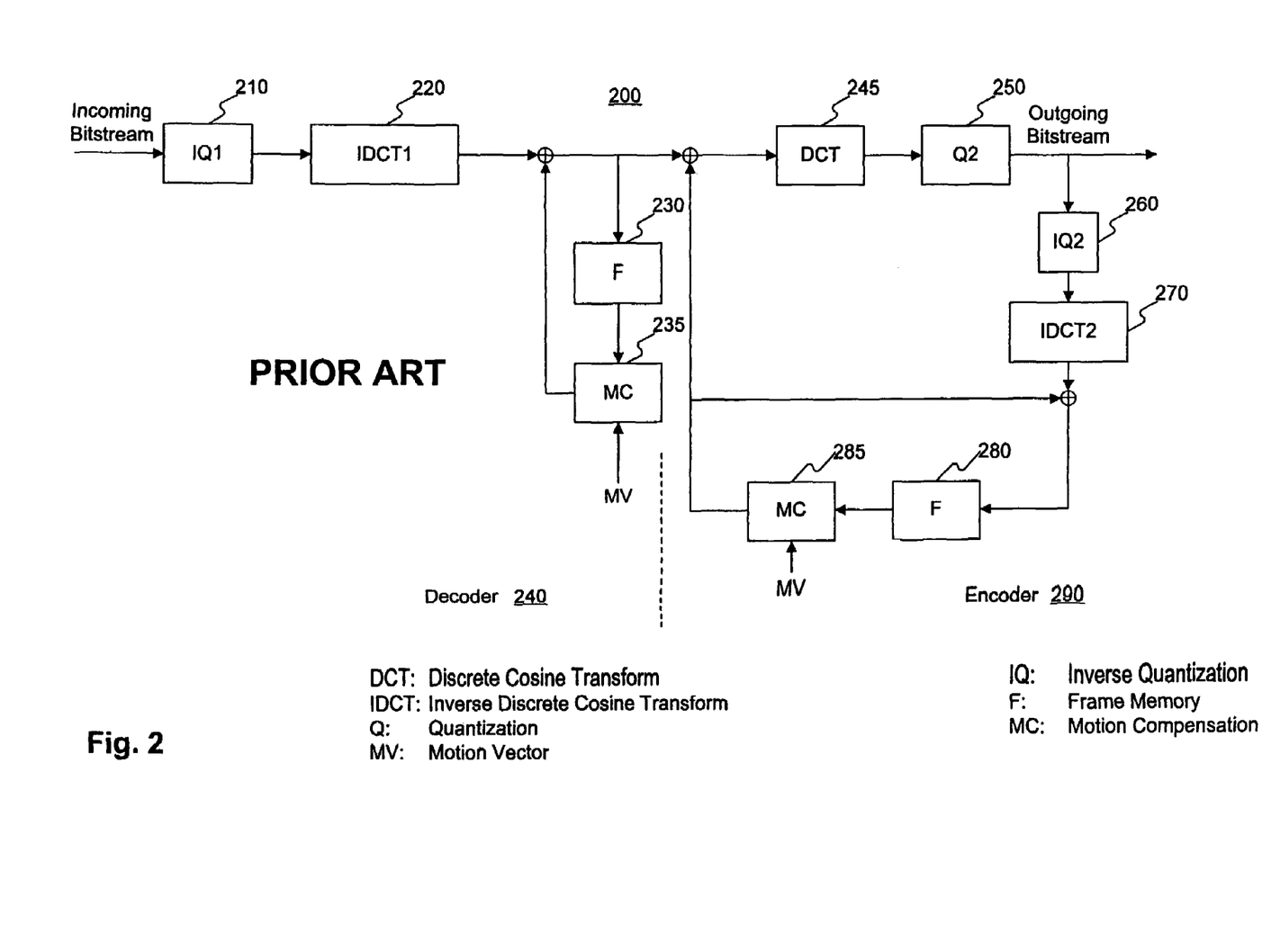
FIG. 2 shows a structure of a cascaded pixel-domain transcoder.

FIG. 2 shows a direct implementation of the video transcoder as a cascaded pixel-domain transcoder 200. Transcoder 200 decodes an incoming compressed bit-stream into a pixel-domain (e.g., blocks 120 and 160 in FIG. 1), and then re-encodes the decoded video into the desirable bit-rate or format. More particularly, the incoming bit-stream is processed by an inverse quantizer (IQ1) 210 and by an inverse DCT process (IDCT1) 220. The result is stored in a frame memory 230 to enable performing motion compensation at a motion compensator (MC) 235 on the result using motion vectors for decoding of inter-frames. This decoded and motion compensated video is then processed by a DCT process 245 and by a quantizer (Q2) 250 to output the re-encoded bit-stream. The output is re-decoded by an inverse quantizer (IQ2) 260 (inverse of Q2) and by an IDCT2 process 270 (inverse of DCT 245) and then stored in a frame memory 280 to perform motion compensation at a motion compensator (MC) 285 for encoding of inter-frames.

Cascaded pixel-domain transcoder 200 is flexible, since a decoder-loop 240 and an encoder-loop 290 can be totally independent from each other. Therefore, decoder 240 and encoder 290 in transcoder 200 can operate at, for example, different bit-rates, frame-rates, picture resolutions, coding modes, and even different standards. Also, transcoder 200 can be implemented to achieve a drift-free operation if the implementations of inverse discrete cosine transform (IDCT) in the front-encoder, which has encoded the incoming bit-stream, and the end-decoder, which will receive the outgoing bit-stream, are known. In this case, the decoder-loop and the encoder-loop can be implemented to produce exactly the same reconstructed pictures as those in the front-encoder and the end-decoder, respectively. If the implementations of the IDCT are not known but satisfy the IDCT standards specifications defined, for example, in IEEE 1180-1990, and the macroblocks are refreshed as specified in the standards such as ISO/IEEE 13818-2 and ITU-T Recommendation H.263, the drift will not be a major issue. Less drift errors result in a higher quality of pictures.

On the other hand, cascaded pixel-domain transcoder 200 is computationally expensive. The overall complexity is not as high as the sum of a decoder and an encoder in a case of reusing several coding parameters such as coding modes (Intra/Inter) and motion vectors (MVs) in transcoder 200.

Even with this arrangement, however, a disadvantage of high-complexity still remains.

In implementing transcoders, the computational complexity and picture quality are usually the issues to be traded off to meet various requirements in practical applications. For example, the computational complexity is critical in real-time applications to speed up the transcoding operations.

Figure 3:
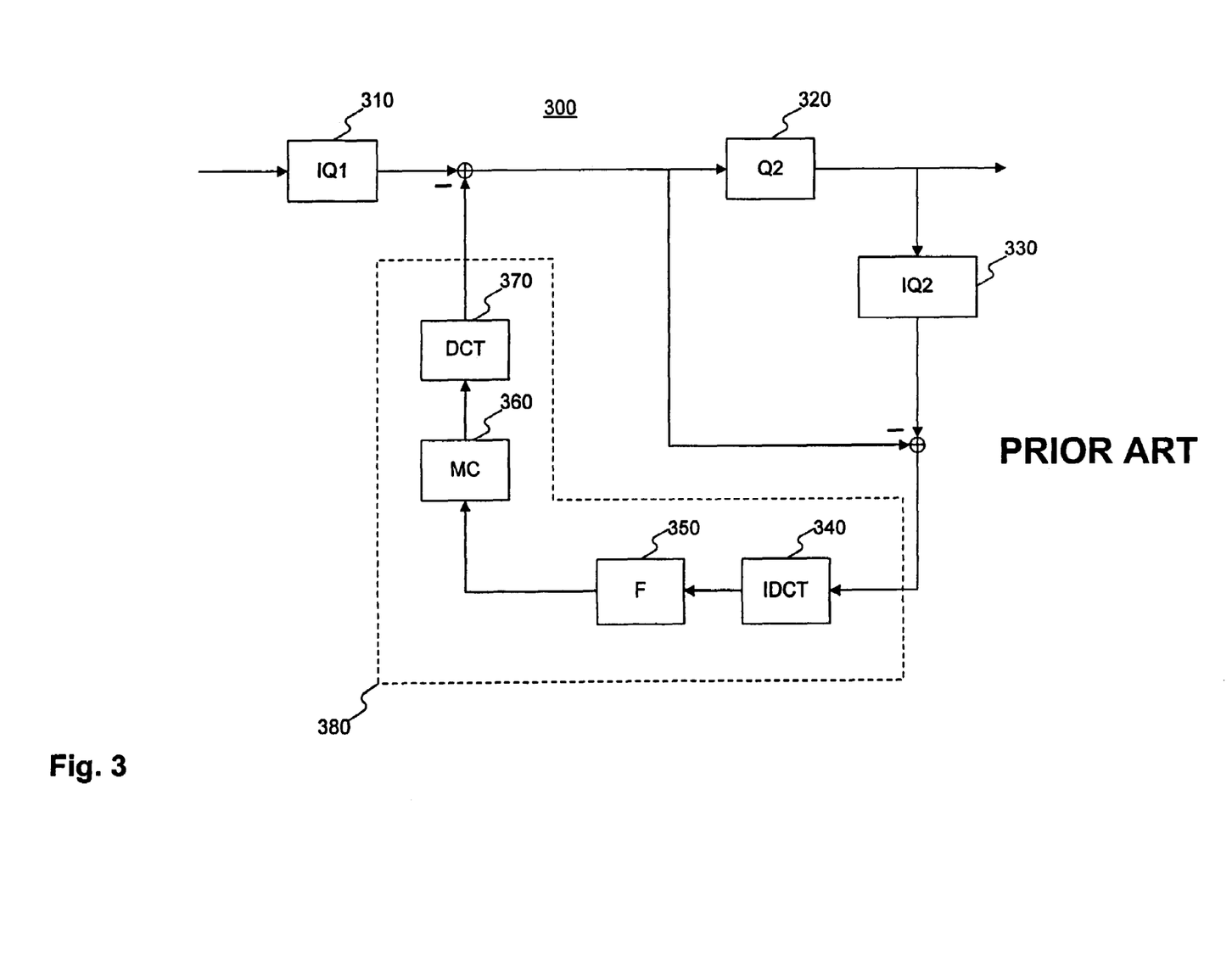
FIG. 3 shows a structure of a simplified pixel-domain transcoder (SPDT)

Several fast video transcoder architectures have thus been proposed. FIG. 3 shows a simplified pixel-domain transcoder (SPDT) 300, which reduces the computational complexity of the cascaded transcoder by reusing motion vectors and merging the decoding and encoding process. In transcoder 300, IDCT 220, MC 235, and frame memory 230 of the cascaded transcoder are eliminated. That is, transcoder 300 performs an inverse quantization on an incoming bit-stream at an inverse quantizer (IQ1) 310, and the result is re-quantized by a quantizer (Q2) 320 to output a transcoded bit-stream. For transcoding of inter-frames, the output is subjected to inverse quantization by an inverse quantizer (IQ2) 330 (inverse of Q2), and then an IDCT 340 and a DCT 370 are used to perform a motion compensation in a pixel domain. In transcoder 300, IDCT 340 operates on a difference of the results of IQ2 330 and IQ1 310. The result is stored in a frame memory 350 for motion compensation by a motion compensator (MC) 360.

SDPT 300 has the advantage of low-complexity, but considerable drift errors may occur due to the merge of decoding and encoding processes, non-linear half-pixel interpolations, and finite word-length DCT and IDCT computations.

Figures 4A, 4B:
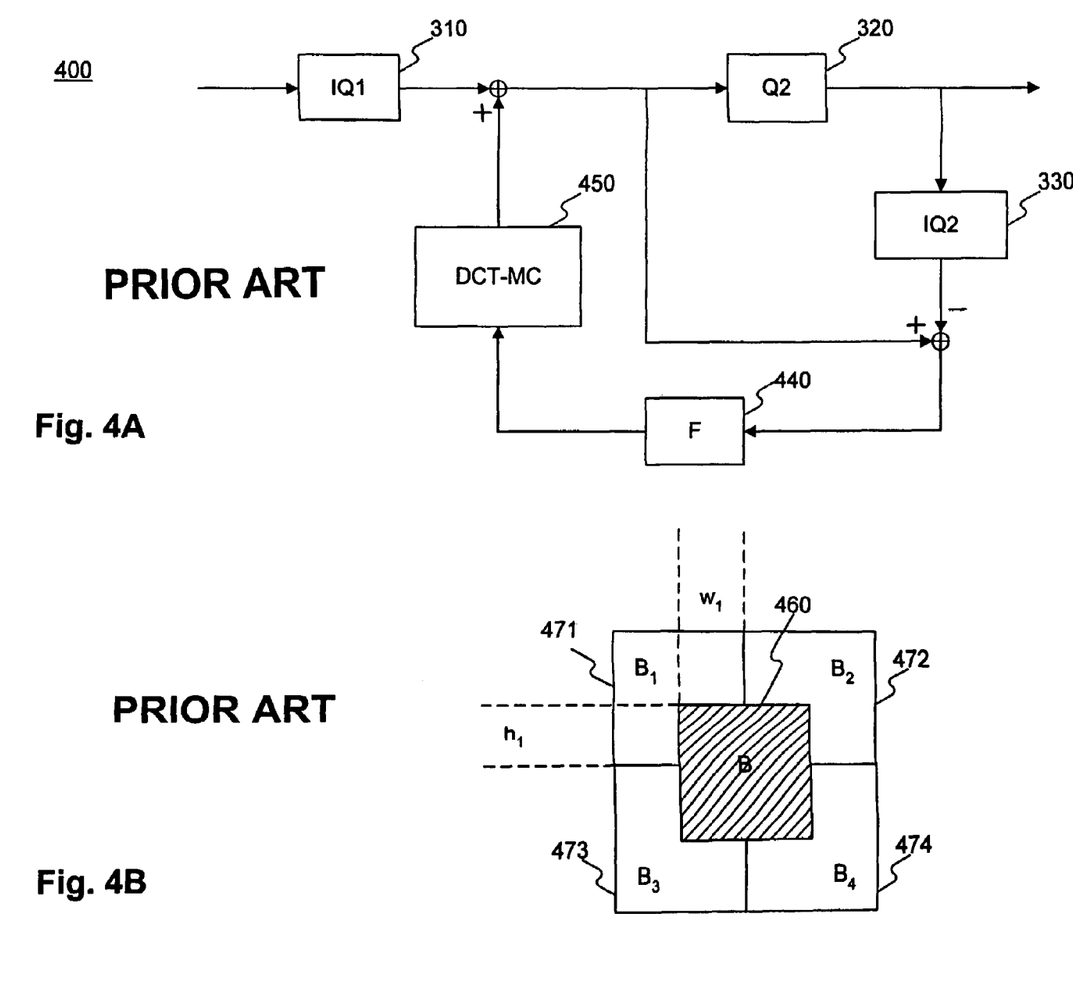
FIG. 4A shows a structure of a DCT-domain transcoder (DDT)
FIG. 4B illustrates motion compensation (MC) operations in the DCT domain.

Further simplifications have been proposed by performing motion compensation LAW OFFICES in a DCT domain (e.g., blocks 130 and 180 in FIG. 1) so that no DCT/IDCT operation is required. FIG. 4A shows such a DCT-domain transcoder (DDT) 400, in which a DCT-domain motion compensator (DCT-MC) 450 and a frame memory 440 are substituted for a series of units 380 (from IDCT 340 to DCT 370) of SPDT 300.

As shown in FIG. 4B, the DCT-MC operation can be represented as computing the coefficients of each target DCT block B 460 from the coefficients of its two or four neighboring DCT blocks 471~474. The neighboring DCT blocks can be referred to as $B_i$, i=1 to 4, where B=DCT(b) and $B_i$=DCT($b_i$) are the blocks of 8×8 DCT coefficients of the associated pixel-domain blocks b and $b_i$ of the image data, respectively. Mathematically, a function of DDT 400 shown in FIG. 4A is equivalent to those of the cascaded architecture shown in FIG. 2 (with motion vector reuse) and SPDT 300 shown in FIG. 3. On the other hand, DDT 400 outperforms SDPT 300 at least to the extent of experiencing much less drift errors.

The DCT coefficients in the DCT-MC operation can be computed as follows:

$$B = \sum_{i=1}^{4} H_{h_i} B_i H_{w_i} \quad (1)$$

where each of $w_i$ and $h_i$ is one of $\{1, 2, \ldots 7\}$. $H_{h_1}$ and $H_{w_1}$ are constant geometric transform matrices defined by the height (h) and width (w) of each sub-block generated by the intersection of $b_i$ with b. Direct computation of Eq. (1) requires 8 matrix multiplications and 3 matrix additions. If using the following equalities in the geometric transform matrices: $H_{h_1}=H_{h_2}$, $H_{h_3}=H_{h_4}$, $H_{w_1}=H_{w_3}$, and $H_{w_2}=H_{w_4}$, the number of operations in Eq. (1) can be reduced to 6 matrix multiplications and 3 matrix additions. Moreover, since $H_{h_1}$ and $H_{w_1}$ are deterministic, at least a part of the operations in Eq. (1) can be pre-computed and then pre-stored in a memory. Therefore, no additional DCT computation is required for the computation of Eq. (1).

DDT 400 has relatively low-complexity compared to the cascaded architecture shown in FIG. 2 (with motion vector reuse), and realizes relatively low drift compared to SPDT 300 shown in FIG. 3.

SUMMARY OF THE INVENTION

Methods and systems consistent with the present invention can provide further reduction of computational complexity for the above-described DDT, while retaining a quality of pictures.

A video transcoding system consistent with the invention transcodes a video sequence in a DCT domain. The video sequence includes frames and each of the frames includes blocks. An input unit in the system receives a video bit-stream including an intra-frame and an inter-frame. The received inter-frame has been encoded by motion compensation based on the intra-frame or another inter-frame. A DCT-domain motion compensation unit in the system then re-calculates first DCT coefficients for a target block in the inter-frame included in the video bit-stream. The motion compensation unit calculates partial DCT coefficients as the re-calculation of the first DCT coefficients for the target block, using significant ones of second DCT coefficients of neighboring blocks in the inter-frame. An output unit in the system then transmits a transcoded video bit-stream including the re-calculated first DCT coefficients.

A method of transcoding a video sequence consistent with the invention first receives a video bit-stream including an intra-frame and an inter-frame. Then, first DCT coefficients for a target block in the inter-frame included in the video bit-stream are LAW OFFICES computed by inputting second DCT coefficients of neighboring blocks in the inter-frame and by calculating partial DCT coefficients for the target block using significant ones of the second DCT coefficients of the neighboring blocks. A transcoded video bit-stream is output by including the partial DCT coefficients as the first DCT coefficients.

Another method consistent with the invention extracts partial DCT coefficients for a target block in an inter-frame of a video sequence. When first DCT coefficients of neighboring blocks of the target block are input, a first number of significant ones of the first DCT coefficients for each of the neighboring blocks and a second number of partial DCT coefficients of the target block are acquired. Then, the partial DCT coefficients are computed from the significant ones of the first DCT coefficients of the neighboring blocks, based on the first and second numbers. Second DCT coefficients of the target block are generated by including the partial DCT coefficients. The remaining coefficients in the second DCT coefficients are set as zero.

Yet another method consistent with the invention estimates a number of significant DCT coefficients of a target block in an inter-frame of a video sequence. When DCT coefficients of neighboring blocks of the target block are input, respective numbers of significant DCT coefficients of the neighboring blocks are determined based on the input DCT coefficients. Prior to calculating DCT coefficients of the target block, the number of significant DCT coefficients of the target block is estimated based on the determined respective numbers of significant DCT coefficients of the neighboring blocks.

BRIEF DESCRIPTION OF THE DRAWINGS

The accompanying drawings provide a further understanding of the invention and are incorporated in and constitute a part of this specification. The drawings illustrate various embodiments of the invention and, together with the description, serve to explain the principles of the invention.

DETAILED DESCRIPTION

The following detailed description refers to the accompanying drawings. Although the description includes exemplary implementations, other implementations are possible and changes may be made to the implementations described without departing from the spirit and scope of the invention. The following detailed description does not limit the invention. Instead, the scope of the invention is defined by the appended claims. Wherever possible, the same reference numbers will be used throughout the drawings and the following description to refer to the same or like parts.

Determination of the Number of Significant DCT Coefficients

Each block of DCT (130 or 180 in FIG. 1) may have only a limited number of low-frequency coefficients (135 in FIG. 1) with non-zero values. Though computation of only these significant coefficients may lead to computation reduction, actual reduction is not realized as long as the number of significant coefficients is unknown prior to the DCT computation.

Methods and systems consistent with the present invention can determine, in the DCT-MC shown in FIG. 4B, how many high-frequency coefficients in the target DCT block B can be dropped to skip the computation of these high-frequency DCT coefficients, as will be described with reference to FIG. 5B. Thus, methods and systems consistent with the invention can reduce the computational complexity, without introducing significant visual quality degradation.

Figure 5A:
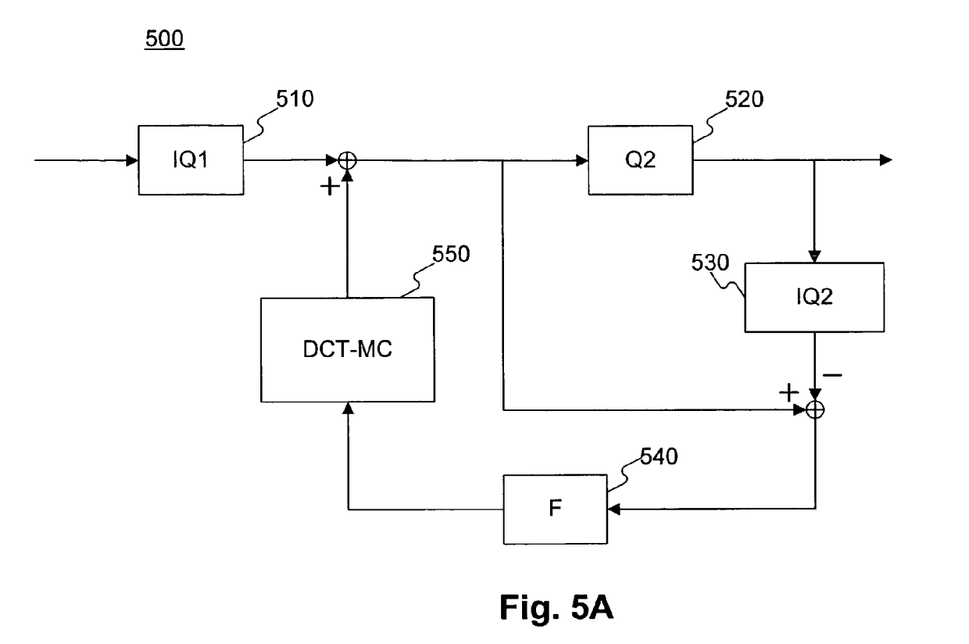
FIG. 5A shows an exemplary structure of a DDT consistent with the present invention.

FIG. 5A shows an exemplary DCT-domain transcoder (DDT) 500 consistent with the present invention. In transcoder 500, an inverse quantizer (IQ1) 510 performs inverse quantization on an incoming bit-stream, and the result is re-quantized by a second-stage quantizer (Q2) 520. For transcoding of inter-frames, the output is operated on by an inverse quantizer (IQ2) 530. IQ1 510, Q2 520, IQ2 530, and a frame memory 540 in transcoder 500 can be constructed to perform the same functions as IQ1 310, Q2 320, IQ2 330, and frame memory 440 in transcoder 400, respectively.

Transcoder 500 performs motion compensation in the DCT domain at a DCT-MC 550 on a difference of the results of IQ2 530 and IQ1 510. Thus, the DCT coefficients stored in frame memory 540 are the sums of the DCT coefficients of the incoming bit-stream and the motion-compensated second-stage quantization errors of the DCT coefficients in the feedback-loop. Therefore, energy distributions of the DCT block obtained from DCT-MC 550 will likely be small and mainly concentrated in the low-frequency region. Methods and systems consistent with the invention approximate the whole 8×8 DCT block B by calculating only n×n (n is smaller than 8) significant low-frequency coefficients, thereby achieving computation reduction.

To determine an appropriate number n for DCT block B, methods and systems consistent with the invention first determine the number of significant coefficients for each of the neighboring blocks $B_1$~$B_4$, and then estimate the number n for block B based on the numbers of significant coefficients determined for blocks $B_1$~$B_4$. The first determination process may use an "energy" criterion, which is described below. The next estimation process may use dependency among the target DCT block and its neighboring blocks, as described below in detail.

Figure 6A:
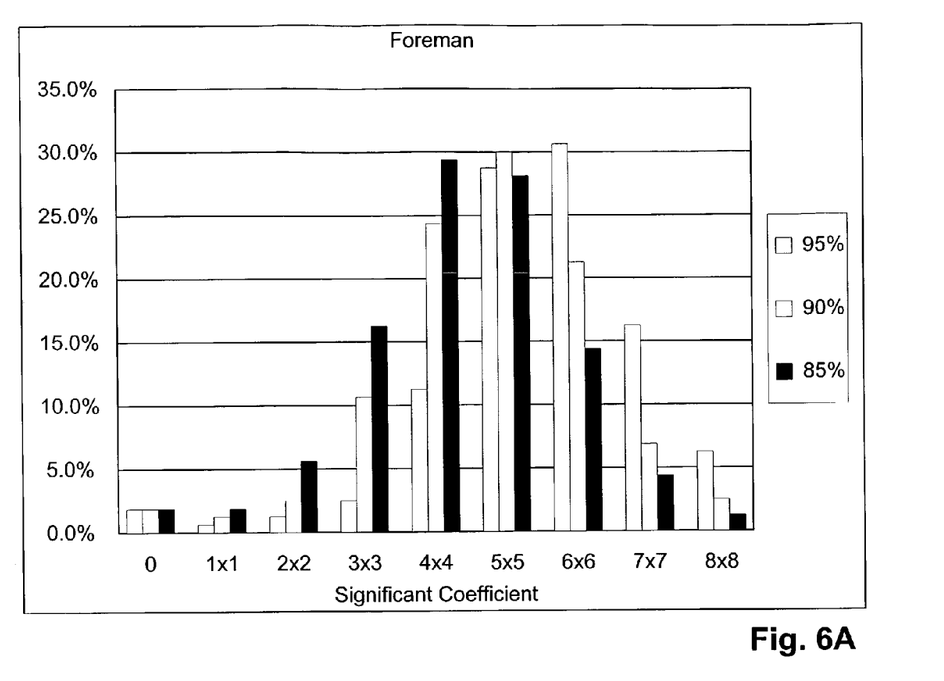
FIGS. 6A and 6B show distributions of the number of significant DCT coefficients, determined consistent with the present invention, in standardized test video sequences called "Foreman" and "Carphone," respectively.
Figure 6B:
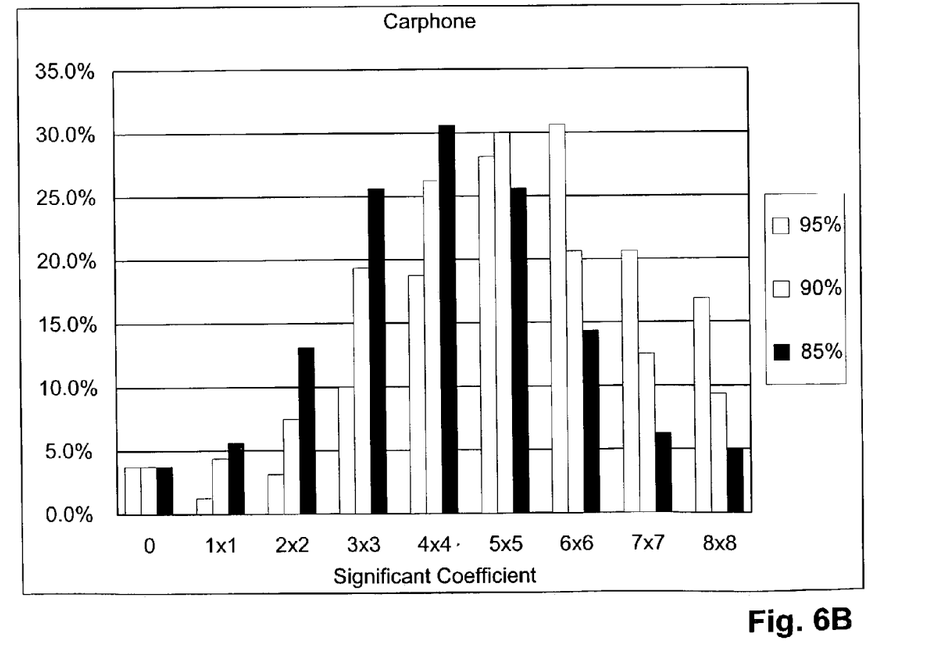

FIGS. 6A and 6B show how the "energy" criterion works, by illustrating the distributions of the number of significant low-frequency DCT coefficients for the DCT-MC computation in DDT 400 with two H.263 test sequences: "Foreman" and "Carphone." A function energy (n) is defined as the squared sum of the n×n lowest-frequency coefficients of a DCT block B:

$$\text{energy}(n) = \sum_{l=0}^{n-1} \sum_{m=0}^{n-1} B^2(l, m) \qquad (2)$$

where B(l, m) is the l-th row and m-th column DCT coefficient of B, and B(0, 0) represents the DC component. First, the full 8×8 DCT coefficients were computed to calculate an energy(8). The number of significant low-frequency DCT coefficients for each DCT block was then determined by calculating the smallest n such that the energy ratio energy(n)/energy(8) was not less than a threshold T. In the simulation shown in FIGS. 6A and 6B, for comparison purpose, the threshold value T was set as 95%, 90% and 85%, respectively. FIGS. 6A and 6B suggest that the number of significant coefficients of most 8×8 DCT blocks ranges from 3×3 to 6×6, meaning that about an 86% to 44% computation saving can usually be achieved. It is also suggested that about 75% of the DCT blocks have 4×4~6×6 significant coefficients, which only need about 12.5~42% of the original computation for full 8×8 coefficients.

Figure 5B:
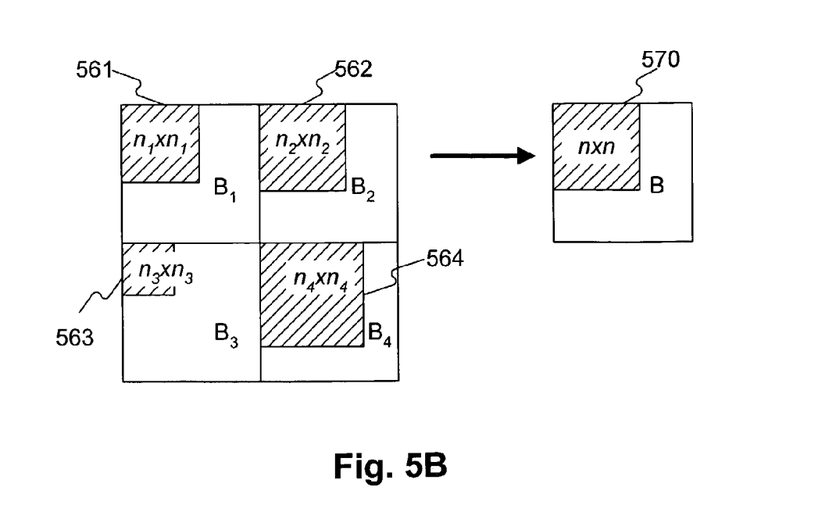
FIG. 5B illustrates extraction of significant DCT coefficients consistent with the present invention.

FIG. 5B illustrates extraction of partial DCT coefficients in the DCT-MC operation. The number of significant low-frequency DCT coefficients of i-th neighboring block $B_i$ 561~564 is $n_i \times n_i$, and n×n lowest-frequency DCT coefficients of target block B 570 are extracted. As described above, the number of significant low-frequency DCT coefficients of the target block B can be estimated from the energy distributions of the four neighboring blocks $B_1$–$B_4$ by, for example, a bilinear interpolation scheme as shown below. Similarly to Eq. (1), the energy of N×N coefficients is defined as:

$$energy_i(N) = \sum_{l=0}^{N-1} \sum_{m=0}^{N-1} B_i^2(l, m) \quad (3)$$

where $B_i(l, m)$ is the l-th row and m-th coefficient of $B_i$, and $B_i(0, 0)$ represents the DC component. For the i-th neighboring block $B_i$, the associated number of significant coefficients, $n_i \times n_i$ is determined by calculating the smallest $n_i$ that makes $energy(n_i)/energy(8)$, determined in accordance with Eq. (3), not less than T.

After determining $n_i$ for each inter-coded block $B_i$, an overlapping area $k_i$ of the target block B with each of four neighboring blocks $B_i$ (i=1 to 4) in FIG. 5B is calculated. If the largest overlapping area $k_i$ is greater than a predetermined threshold K, the neighboring block $B_i$ with the largest overlapping area is selected as the dominant block, and it is determined that $n=n_i$. Otherwise, n is estimated from $n_i$ (i=1 to 4), by using the following bilinear interpolation method:

$$n = \frac{1}{64} \sum_{i=1}^{4} k_i n_i \quad (4)$$

Equation (4) is a example of using dependency among the target DCT block and its neighboring blocks. As described above, the target block (B) has four component sub-blocks, and each sub-block of the target block is part of its corresponding neighboring block ($B_1$–$B_4$). Therefore, the DCT coefficients of the target block are highly correlated to those of the neighboring blocks. As a result, the distribution of DCT coefficients (e.g. the number of significant coefficients) in the target block has high dependency with the four neighboring blocks. Other equations for calculating n is from $n_i$(i=1 to 4) may be implemented to use this dependency.

In the above embodiments, the "energy" criterion is used in determining the number of significant DCT coefficients for each neighboring block ($B_1$–$B_4$). However, other criteria may alternatively be used. One exemplary alternative criterion is the sum of absolute DCT coefficients, in which the following equation (3') is used in place of equation (3).

$$SA(N) = \sum_{l=0}^{N-1} \sum_{m=0}^{N-1} |B(l, m)| \quad (3')$$

Another exemplary alternative criterion is the ratio of the number of nonzero coefficients contained in a square (N×N) or rectangular (M×N) block with respect to the total number of nonzero coefficients. Using different criteria may lead to different estimates of number of significant coefficients, thereby resulting in different estimation accuracy (i.e., different video quality). However, all may achieve computation reduction.

Methods and systems consistent with the invention can process a M×N rectangular block of DCT coefficients by modifying the above-described embodiments for the N×N square block as follows. The number of significant coefficients of the ith neighboring block is determined as $m_i \times n_i$, by calculating the smallest ($m_i$, $n_i$) that makes $energy(m_i, n_i)/energy(8,8)$, determined in the following equation (3"), not less than T.

$$energy(M, N) = \sum_{m=0}^{M-1} \sum_{n=0}^{N-1} B^2(m, n) \quad (3'')$$

Then, the number of significant coefficients of the target block can be estimated as (m, n), by using the following equations (4') and (4").

$$m = \frac{1}{16} \sum_{i=1}^{4} w_i m_i \quad (4')$$

$$n = \frac{1}{16} \sum_{i=1}^{4} h_i n_i \quad (4'')$$

where $w_i$ and $h_i$ are the horizontal and vertical overlapping lengths of the target block B with the i-th neighboring block $B_i$, as FIG. 4B shows $w_1$ and $h_1$ with block $B_1$.

Fast Extraction of Partial DCT Coefficients

When $n_i$ for each block $B_i$ and n for the target block B are determined, methods and systems consistent with the invention can perform the partial DCT coefficient extraction shown in FIG. 5B with less computational complexity as described below. First, Eq. (1) can be approximated as follows:

$$B = T \left( \sum_{i=1}^{4} H_{h_i} T_i B_i T_i H_{w_i} \right) T \quad (5)$$

where $$T = \begin{bmatrix} I_n & 0 \\ 0 & 0 \end{bmatrix} \text{ and } T_i = \begin{bmatrix} I_{n_i} & 0 \\ 0 & 0 \end{bmatrix} (i = 1 \text{ to } 4).$$

$I_n$ is an n×n identity matrix and $I_{n_i}$ is an $n_i \times n_i$ identity matrix where n and $n_i$ take values from 0 to 8.

The matrices $B_i$, $H_{h_i}$, and $H_{w_i}$ can be represented as:

$$B_i = \begin{bmatrix} B_i^{11} & B_i^{12} \\ B_i^{21} & B_i^{22} \end{bmatrix}, H_{h_i} = \begin{bmatrix} H_{h_i}^{11} & H_{h_i}^{12} \\ H_{h_i}^{21} & H_{h_i}^{22} \end{bmatrix}, \text{ and } H_{w_i} = \begin{bmatrix} H_{w_i}^{11} & H_{w_i}^{12} \\ H_{w_i}^{21} & H_{w_i}^{22} \end{bmatrix},$$

where the sub-matrices $H_{h_1}^{11}$, $B_i^{11}$ and $H_{w_1}^{11}$ are of sizes $n \times n_i$, $n_i \times n_i$ and $n_i \times n$, respectively; the sub-matrices $H_{h_1}^{12}$, $B^{i12}$ and $H_{w_1}^{12}$ are of sizes $n \times (8-n_i)$, $n_i \times (8 \times n_i)$ and $n_i \times (8-n)$, respectively; the sub-matrices $H_{h_1}^{21}$, $B_i^{12}$ and $H_{w_1}^{21}$ are of sizes $(8-n) \times n_i$, $(8-n_i) \times n_i$ and $(8-n_i) \times n$, respectively; and the sub-matrices $H_{h_1}^{22}$, $B_i^{22}$ and $H_{w_1}^{22}$ are of sizes $(8-n) \times (8-n_i)$, $(8-n_i) \times (8-n_i)$ and $(8-n_i) \times (8-n)$, respectively. Then, each term in Eq. (5) becomes as follows:

$$TH_{h_i}T_iB_iT_iH_{w_i}T = \begin{bmatrix} I_n & 0 \\ 0 & 0 \end{bmatrix}\begin{bmatrix} H_{h_i}^{11} & H_{h_i}^{12} \\ H_{h_i}^{21} & H_{h_i}^{22} \end{bmatrix}\begin{bmatrix} B_i^{11} & 0 \\ 0 & 0 \end{bmatrix}\begin{bmatrix} H_{w_i}^{11} & H_{w_i}^{12} \\ H_{w_i}^{21} & H_{w_i}^{22} \end{bmatrix}\begin{bmatrix} I_n & 0 \\ 0 & 0 \end{bmatrix} \quad (6)$$

$$= \begin{bmatrix} I_n & 0 \\ 0 & 0 \end{bmatrix}\begin{bmatrix} H_{h_i}^{11}B_i^{11}H_{w_i}^{11} & H_{h_i}^{11}B_i^{11}H_{w_i}^{12} \\ H_{h_i}^{21}B_i^{11}H_{w_i}^{11} & H_{h_i}^{21}B_i^{11}H_{w_i}^{12} \end{bmatrix}\begin{bmatrix} I_n & 0 \\ 0 & 0 \end{bmatrix}$$

$$= \begin{bmatrix} H_{h_i}^{11}B_i^{11}H_{w_i}^{11} & 0 \\ 0 & 0 \end{bmatrix}$$

Substituting Eq. (6) into Eq. (5), the following equation is obtained:

$$B = \sum_{i=1}^{4} \begin{bmatrix} H_{h_i}^{11}B_i^{11}H_{w_i}^{11} & 0 \\ 0 & 0 \end{bmatrix} \quad (7)$$

The numbers of multiplications and additions required for Eq. (7) are $nn_i^2 + n^2n_i$ and $2nn_i^2 + 2n^2n_i - n^2 - nn_i$, respectively. Thus, adjusting the numbers $n_i$ and $n$ can effectively control the trade-off between the computational complexity and the picture quality, thereby making the DCT-MC operation computationally scalable. The average numbers of multiplication and addition operations required for Eq. (7) for each 8×8 block are thus $$2\sum_{i=1}^{4}\sum_{n,n_i} P_n P_{n_i}(nn_i^2 + n^2n_i) \text{ and } 2\sum_{i=1}^{4}\sum_{n,n_i} P_n P_{h_i}(nn_i^2 + n^2n_i - nn_i - n^2),$$

respectively, where $P_n$ and $P_{n_1}$ respectively represent the probabilities of $n$ and $n_i$, taking values from 0 to 8.

According to the above numbers of multiplications and additions, the present embodiment consistent with the invention can reduce the DCT-MC computation to 0.2%, 1.6%, 5.3%, 12.5%, 24.4%, 42%, and 67% for 1×1, 2×2, 3×3, 4×4, 5×5, 6×6, and 7×7 significant coefficients, respectively, compared to the original computation for full 8×8 coefficients. This low computational complexity is also advantageous, compared to SPDT 300 depicted in FIG. 3, which requires one 8×8 DCT, one 8×8 IDCT, and one block shift operation for each 8×8 block.

The fast coefficient extraction schemes consistent with the invention can achieve computation reduction in two aspects. First, only partial (significant) DCT coefficients of the target block B are computed. Second, only significant DCT coefficients of the four neighboring blocks $B_1$–$B_4$ (or two of them when h=0 or w=0) are used for computation. The number of significant DCT coefficients of a DCT block is usually much less than 64 (8×8) as has been illustrated in FIGS. 6A and 6B.

Fast Transcoding in the DCT Domain (Fast DDT)

Methods and systems consistent with the invention can provide a fast DCT-domain transcoder (fast DDT) by combining the determination of the number of significant coefficients and the fast extraction of partial coefficients described above.

Figure 7:
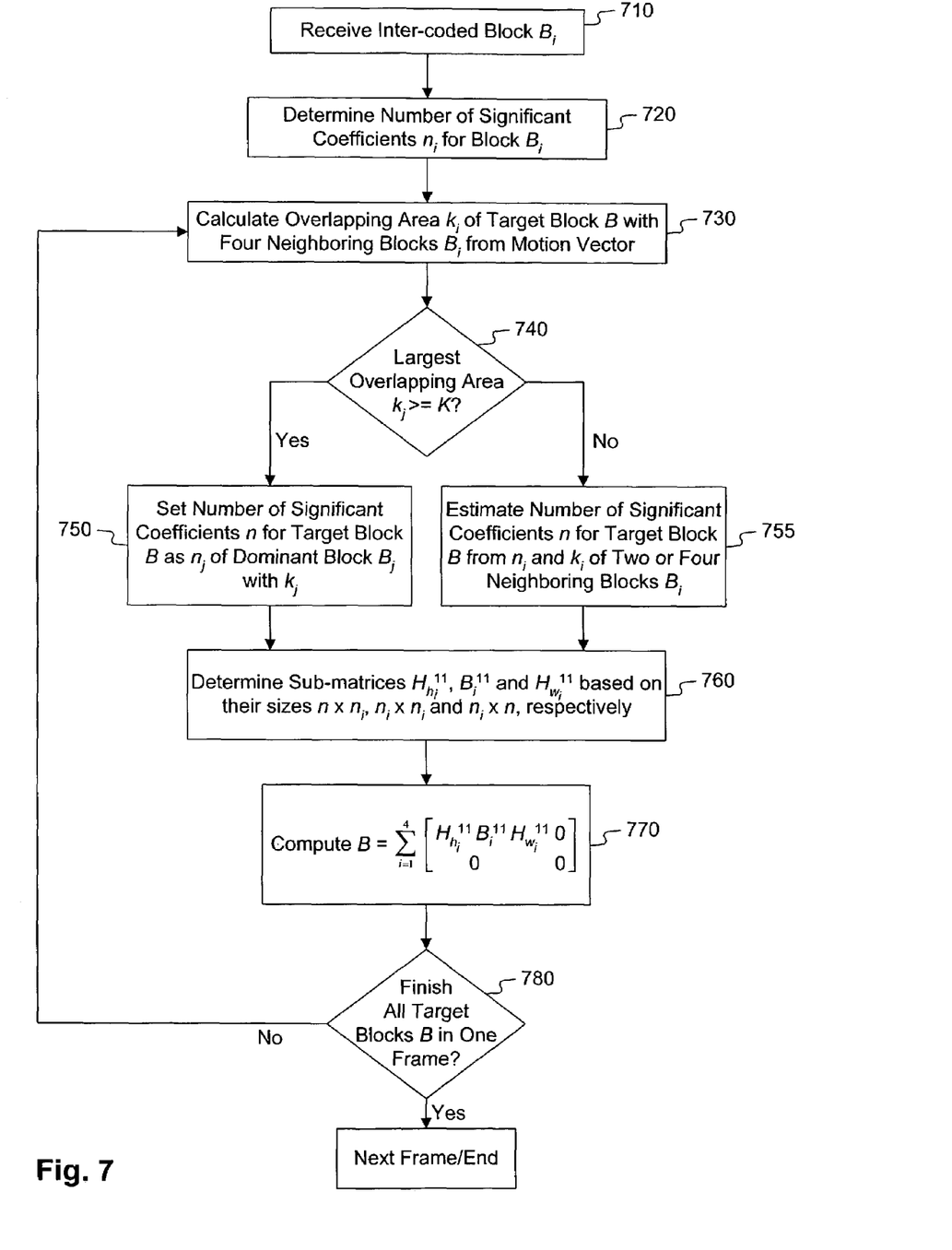
FIG. 7 is a flowchart showing exemplary operations of a DCT-MC consistent with the present invention.

FIG. 7 is a flowchart showing exemplary DCT-MC operations in the fast DDT consistent with the invention. First, DCT-MC 550 in FIG. 5A receives inter-coded blocks $B_i$ from frame memory 540 (step 710). DCT-MC 550 then determines the number of significant DCT coefficients $n_i$ for each block $B_i$ using, for example, the "energy" criterion described above (step 720).

Next, DCT-MC 550 determines the number of significant DCT coefficients n for the target block B. For this purpose, DCT-MC 550 calculates overlapping area $k_i$ of the target block B with four neighboring blocks $B_i$ (i=1~4) from a motion vector of the target block B (step 730). If the largest overlapping area $k_j$ is greater than the threshold K (step 740 Yes), DCT-MC 550 sets the number n equal to $n_j$ of the dominant block $B_j$ that has the largest overlapping area $k_j$ (step 750). Otherwise (step 740 No), DCT-MC 550 estimates the number n based on $n_i$ and $k_i$ of two or four neighboring blocks $B_i$ using, for example, the bilinear interpolation scheme described above (step 755).

With the determined n and $n_i$, DCT-MC 550 determines the sub-matrices $H_{h_1}^{11}$, $B_i^{11}$ and $H_{w_1}^{11}$, whose sizes are $n \times n_i$, $n_i \times n_i$ and $n_i \times n$, respectively (step 760), to compute DCT coefficients of the target block B using Eq. (7) (step 770). DCT-MC 550 repeats steps 730 to 770 until all the inter-coded blocks B in a picture are processed (step 780).

The computational complexity of Eq. (7) can be further reduced if the elements of the matrices $H_{h_1}$ and $H_{w_1}$ are approximated by using binary numbers with a maximum distortion of 1/32. With this approximation, the multiplications are simplified to basic integer operations, such as "shift-right" and "add." Other methods and systems to make the DCT-MC algorithm faster (e.g., using shared information in a macroblock) can also be combined with methods and systems consistent with the invention for further speed-up.

Performance of the Fast DDT

Figure 8A:
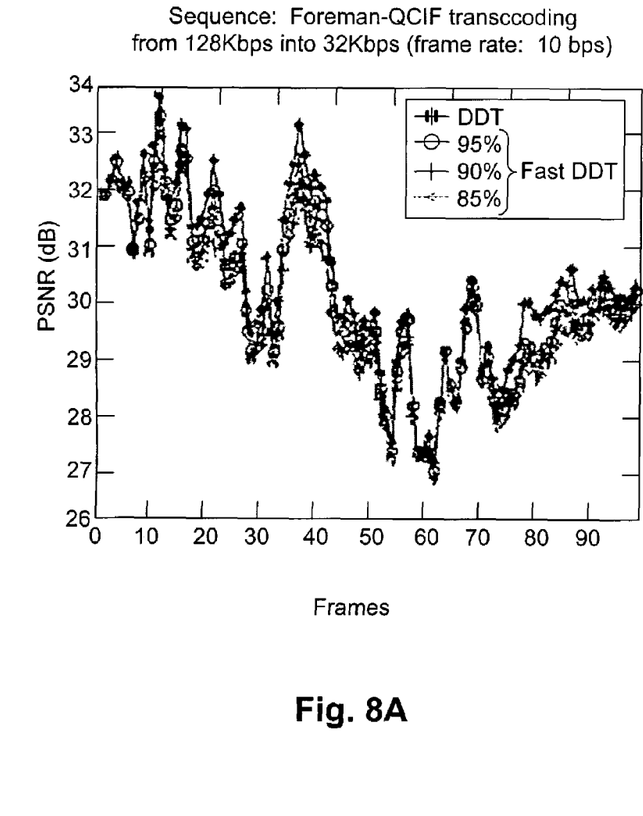
FIGS. 8A and 8B show comparison of peak-signal-to-noise-ratio (PSNR) performance between a conventional DDT and a fast DDT (three exemplary schemes) consistent with the present invention, in standardized test video sequences called "Foreman" and "Carphone," respectively.
Figure 8B:
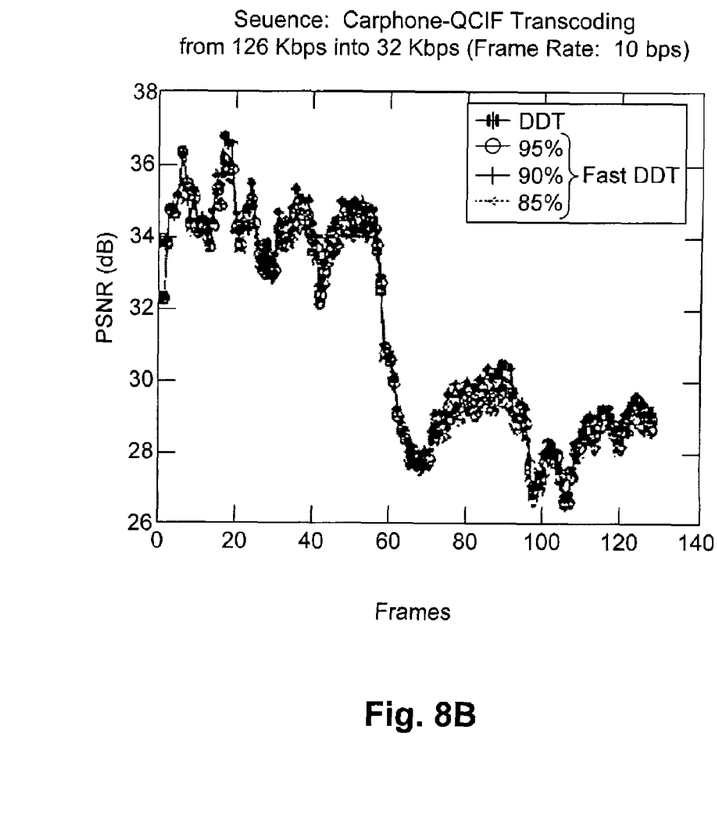
Figure 9A:
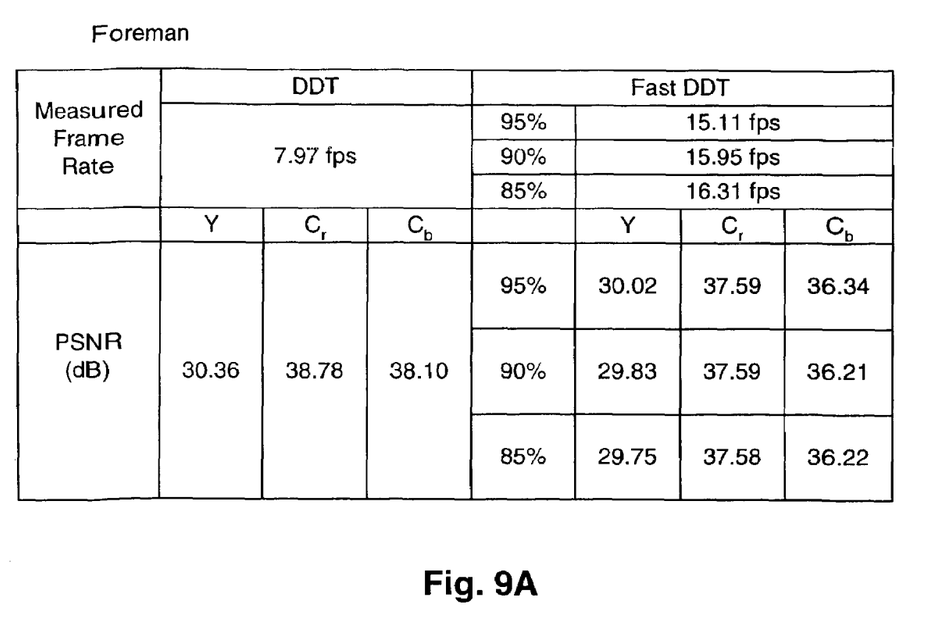
FIGS. 9A and 9B show comparison of operation speed in addition to PSNR performance between the conventional DDT and a fast DDT (three exemplary schemes) consistent with the present invention, in standardized test video sequences called "Foreman" and "Carphone," respectively.
Figure 9B:
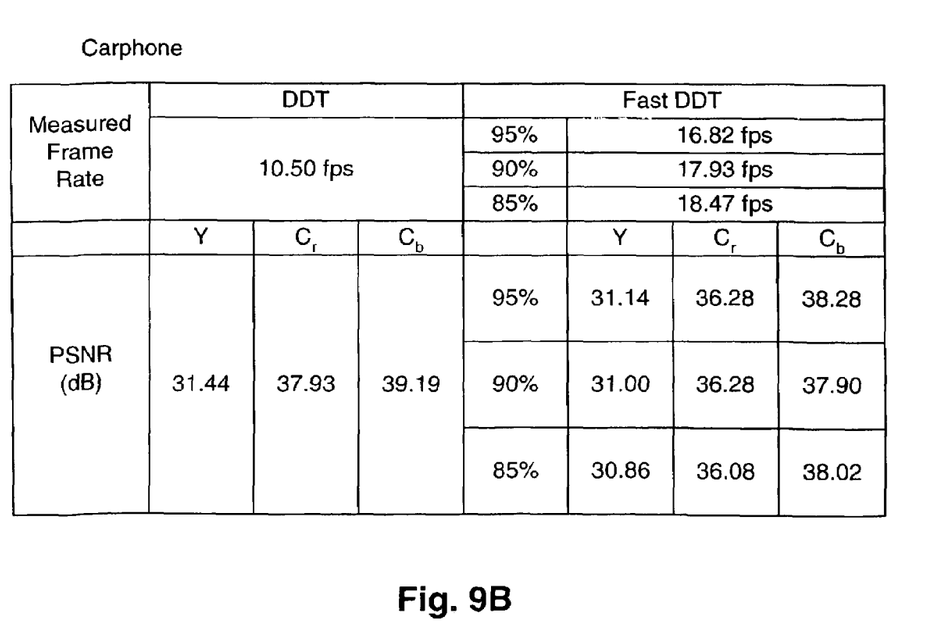

FIGS. 8A and 8B show average PSNR performance of the fast DDT described above, compared to the DDT with full 8×8 coefficients. FIGS. 9A and 9B show per-frame PSNR performance and a measured frame rate of the fast DDT described above, compared to the DDT with full 8×8 coefficients. The threshold value T in the "energy" criterion of the fast DDT was empirically set as 0.85, 0.9, and 0.95, respectively, in the experiments. In the experiments, two QCIF (176×144) image sequences: "Foreman" and "Carphone" with a frame-rate of 10 fps (reduced from a capture frame-rate of 30 fps) were first encoded at 128 Kbps as the test input bit-streams. The test bit-streams were then transcoded into 32 Kbps respectively, using each of the full DDT and the fast DDT schemes with three respective thresholds.

The partial DCT-MC computation will theoretically cause drift errors since the MC prediction loops in the transcoder and the end-decoder are no longer coherent with each other. However, FIGS. 8A, 8B, 9A, and 9B show that the performance of the fast DDT is close to that of the DDT and the drift error due to the partial DCT-MC computations is sufficiently minor when T is chosen large enough. Especially in MPEG encoded videos, these drift errors can be negligible since I-frames are periodically inserted to refresh the drift.

FIGS. 9A and 9B also show the comparison of the measured processing frame-rates. The simulations were performed on an Intel Pentium-III 733 MHz PC. The speed-up factor achieved by the fast DCT-MC schemes ranges from 1.9 to 2.05 with "Foreman" and 1.6 to 1.76 with "Carphone" for threshold T=0.95 to 0.85, respectively. The above threshold range can achieve good speed-up, while maintaining close picture quality to the DDT.

Persons of ordinary skill will realize that many modifications and variations of the above embodiments may be made without departing from the novel and advantageous features of the present invention. Accordingly, all such modifications and variations are intended to be included within the scope of the appended claims. The specification and examples are only exemplary. The following claims define the true scope and sprit of the invention.

We claim:

1. A video transcoding system for transcoding a video sequence in a discrete cosine transform (DCT) domain, the video sequence including frames and each of the frames including blocks, the system comprising:
an input unit configured to receive a video bit-stream including an intra-frame and an inter-frame, the inter-frame having been encoded by motion compensation based on the intra-frame or another inter-frame;
a DCT-domain motion compensation unit configured to re-calculate first DCT coefficients for a target block in the inter-frame included in the video bit-stream received by the input unit; and
an output unit configured to transmit a transcoded video bit-stream including the first DCT coefficients re-calculated by the motion compensation unit, and wherein the motion compensation unit calculates partial DCT coefficients as the re-calculation of the first DCT coefficients for the target block, using significant ones of second DCT coefficients of neighboring blocks in the inter-frame, wherein the significant ones exclude one or more high-frequency coefficients in the target block.

2. The system of claim 1, wherein the motion compensation unit calculates the partial DCT coefficients based on a dependency among the target block and the neighboring blocks.

3. The system of claim 1, wherein the motion compensation unit further specifies the significant ones of the second DCT coefficients in each of the neighboring blocks such that a ratio of a first calculation result of the significant ones of the second DCT coefficients to a second calculation result of all of the second DCT coefficients is greater than a predetermined threshold.

4. The system of claim 3, wherein the motion compensation unit calculates an energy of the significant ones of the second DCT coefficients as the first calculation result and an energy of all of the second DCT coefficients as the second calculation result.

5. The system of claim 3, wherein the motion compensation unit calculates a sum of absolute value of the significant ones of the second DCT coefficients as the first calculation result and a sum of absolute value of all of the second DCT coefficients as the second calculation result.

6. The system of claim 3, wherein the motion compensation unit counts a number of non-zero coefficients among the significant ones of the second DCT coefficients as the first calculation result and a number of non-zero coefficients among all of the second DCT coefficients as the second calculation result.

7. The system of claim 1, wherein the motion compensation unit further estimates a number of the partial DCT coefficients for the target block based on a number of the significant ones of the second DCT coefficients in each of the neighboring blocks.

8. The system of claim 7, wherein the motion compensation unit estimates the number of the partial DCT coefficients using an overlapping area of the target block with each of the neighboring blocks.

9. The system of claim 7, wherein the motion compensation unit calculates the partial DCT coefficients according to the number estimated for the target block in order to skip a part of the re-calculation of the first DCT coefficients beyond the number of the partial DCT coefficients.

10. The system of claim 1, wherein each block contains N×N DCT coefficients, where N is a positive integer, and the partial DCT coefficients is n×n DCT coefficients, where n is a positive integer not greater than N.

11. The system of claim 1, wherein each block contains M×N DCT coefficients, where M and N are positive integers that are different from each other, and the partial DCT coefficients is m×n DCT coefficients, where m is a positive integer not greater than M and n is a positive integer not greater than N.

12. A method for transcoding a video sequence in a discrete cosine transform (DCT) domain, the video sequence including frames and each of the frames including blocks, the method comprising:
receiving a video bit-stream including an intra-frame and an inter-frame, the inter-frame having been encoded depending on the intra-frame or another inter-frame;
computing first DCT coefficients for a target block in the inter-frame included in the video bit-stream, by inputting second DCT coefficients of neighboring blocks in the inter-frame and by calculating partial DCT coefficients for the target block using significant ones of the second DCT coefficients of the neighboring blocks, wherein the significant ones exclude one or more high-frequency coefficients in the target block; and
outputting a transcoded video bit-stream including the partial DCT coefficients as the first DCT coefficients.

13. A method for extracting partial discrete cosine transform (DCT) coefficients for a target block in an inter-frame of a video sequence, the inter-frame being encoded depending on an intra-frame of the video sequence or another inter-frame of the video sequence, the method comprising:
inputting first DCT coefficients of neighboring blocks of the target block;
acquiring a first number of significant ones of the first DCT coefficients for each of the neighboring blocks and a second number of partial DCT coefficients of the target block;
computing, based on the first and second numbers, the partial DCT coefficients from the significant ones of the first DCT coefficients of the neighboring blocks, wherein the significant ones exclude one or more high-frequency coefficients in the target block; and generating second DCT coefficients of the target block by including the partial DCT coefficients and remaining coefficients, the remaining coefficients being set as zero.

14. The method of claim 13, wherein the first number for one of the neighboring blocks is different from the first number for another of the neighboring blocks, and the step of computing uses a number of the significant ones of the first DCT coefficients of one of the neighboring blocks and another number of the significant ones of the first DCT coefficients of another of the neighboring blocks.

15. The method of claim 13, wherein the computing ignores remaining ones of the first DCT coefficients of the neighboring blocks over the first number, and stops computing when a number of the partial DCT coefficients reaches the second number.

16. A method for estimating a number of significant discrete cosine transform (DCT) coefficients of a target block in an inter-frame of a video sequence, the inter-frame being encoded depending on an intra-frame of the video sequence or another inter-frame of the video sequence, the method comprising:
inputting DCT coefficients of neighboring blocks of the target block;
determining respective numbers of significant DCT coefficients of the neighboring blocks based on the input DCT coefficients, wherein the significant DCT coefficients exclude one or more high-frequency coefficients in the target block; and
estimating, prior to calculating DCT coefficients of the target block, the number of significant DCT coefficients of the target block based on the determined respective numbers of significant DCT coefficients of the neighboring blocks.

17. The method of claim 16, wherein the determining includes calculating a first energy of all of the DCT coefficients of each of the neighboring blocks and a second energy of a certain number of the DCT coefficients of said each of the neighboring blocks, and selecting the certain number as each of the respective numbers according to a ratio of the second energy to the first energy.

18. The method of claim 16, wherein the estimating includes determining respective overlapping areas of the target block with the neighboring blocks, and calculating the number for the target block from the respective numbers for the neighboring blocks weighted by the respective overlapping areas.

19. The method of claim 16, wherein each block contains N×N DCT coefficients, where N is a positive integer, and the number of significant DCT coefficients is determined as n×n, where n is a positive integer not greater than N.

20. The method of claim 16, wherein each block contains M×N DCT coefficients, where M and N are positive integers that are different from each other, and the number of significant DCT coefficients is determined as m×n, where m is a positive integer not greater than M and n is a positive integer not greater than N.

* * * * *